US007992628B2

(12) United States Patent
Melby et al.

(10) Patent No.: US 7,992,628 B2
(45) Date of Patent: Aug. 9, 2011

(54) MULTI-PASSING LIQUID COOLED CHARGE AIR COOLER WITH COOLANT BYPASS PORTS FOR IMPROVED FLOW DISTRIBUTION

(75) Inventors: Robert M. Melby, Racine, WI (US); Jason J. Braun, Franksville, WI (US); Thomas J. Reiss, Oak Creek, WI (US); David E. Janke, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 1439 days.

(21) Appl. No.: 11/430,440

(22) Filed: May 9, 2006

(65) Prior Publication Data
US 2007/0261815 A1 Nov. 15, 2007

(51) Int. Cl.
F28F 3/00 (2006.01)
F28F 3/08 (2006.01)
B60H 1/00 (2006.01)
(52) U.S. Cl. ............... 165/166; 165/41; 165/167
(58) Field of Classification Search .......... 165/148, 165/157, 158, 167, 153, 166, 41
See application file for complete search history.

(56) References Cited

U.S. PATENT DOCUMENTS

| 4,384,611 | A | * | 5/1983 | Fung | 165/166 |
|---|---|---|---|---|---|
| 4,470,455 | A | * | 9/1984 | Sacca | 165/167 |
| 6,250,380 | B1 | * | 6/2001 | Strahle et al. | 165/167 |
| 6,374,911 | B1 | * | 4/2002 | Olson et al. | 165/173 |
| 6,629,561 | B2 | * | 10/2003 | Halt et al. | 165/153 |
| 6,883,502 | B2 | * | 4/2005 | Nechvatal | 165/166 |
| 6,920,918 | B2 | * | 7/2005 | Knecht et al. | 165/166 |
| 7,159,650 | B2 | * | 1/2007 | Brost et al. | 165/167 |
| 7,631,688 | B2 | * | 12/2009 | Brost et al. | 165/166 |
| 2002/0074109 | A1 | * | 6/2002 | Rhodes et al. | 165/153 |
| 2006/0124283 | A1 | * | 6/2006 | Abi-Akar et al. | 165/133 |
| 2007/0017661 | A1 | * | 1/2007 | Geskes et al. | 165/166 |

FOREIGN PATENT DOCUMENTS

| DE | 102004032353 | 1/2006 |
|---|---|---|
| DE | 102005013922 | 9/2006 |

OTHER PUBLICATIONS

"Bypass", The Free Dictionary by Farlex [online]. Farlex, 2010 [retrieved on Nov. 27, 2010]. Retrieved from the Internet: ULR: http://www.thefreedictionary.com/bypass.*
"Dam", The Free Dictionary by Farlex [online]. Farlex, 2010 [retrieved on Nov. 27, 2010]. Retrieved from the Internet: ULR: http://www.thefreedictionary.com/dam.*
Office Action from German Patent Application DE102007021708.2-13, dated May 12, 2010, 7 pages.

* cited by examiner

Primary Examiner — Ljiljana (Lil) V Ciric
(74) Attorney, Agent, or Firm — Michael Best & Friedrich LLP

(57) ABSTRACT

A liquid cooled charge air cooler includes a plurality of pairs of adjacent separator plates supported in parallel spaced relation. The pairs alternatingly define a first set of adjacent pairs in fluid communication with a charge air inlet and a charge air outlet, and a second set of adjacent pairs in fluid communication with a coolant inlet and a coolant outlet. Fins extend between adjacent plates of the first set of adjacent pairs to define a charge air flow path between the charge air inlet and the charge air outlet. A plurality of dams extend between adjacent plates of the second set of adjacent pairs in a select offset configuration to define a multi-pass coolant flow path between the coolant inlet and the coolant outlet. Each dam includes an associated bypass port allowing a portion of coolant to bypass at least a portion of the coolant flow path through the dams.

25 Claims, 2 Drawing Sheets

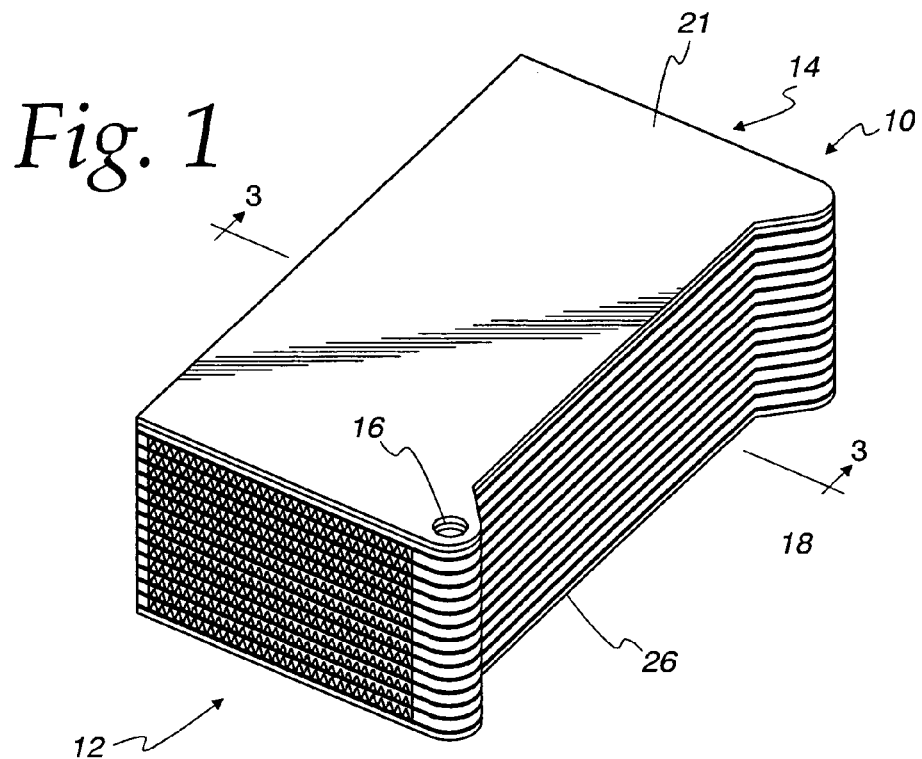
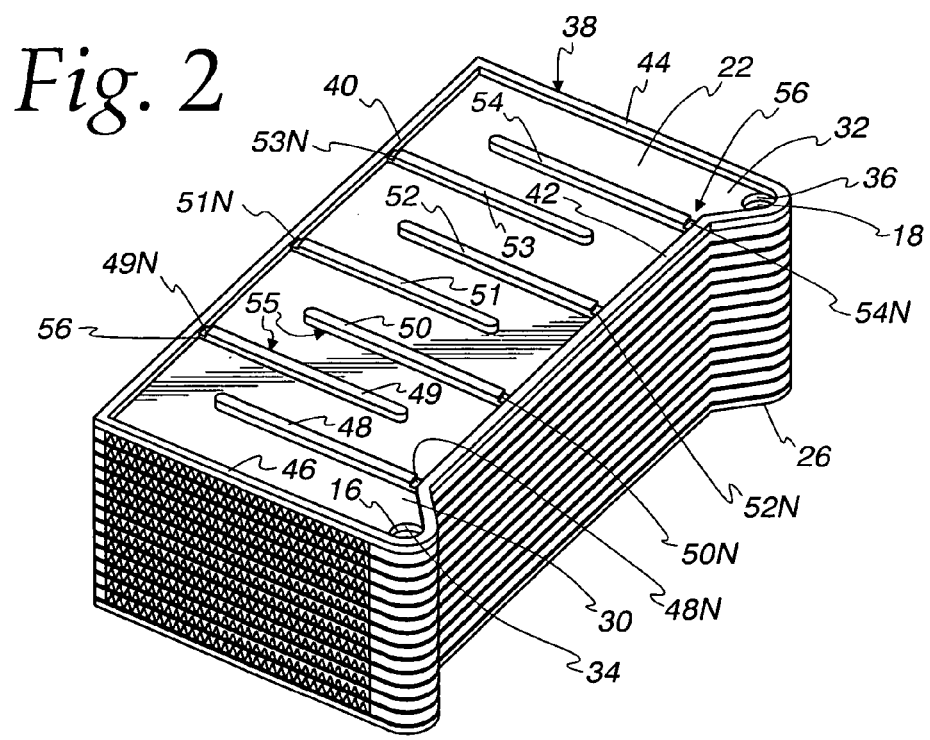

MULTI-PASSING LIQUID COOLED CHARGE AIR COOLER WITH COOLANT BYPASS PORTS FOR IMPROVED FLOW DISTRIBUTION

CROSS REFERENCE TO RELATED APPLICATIONS

There are no related applications.

FIELD OF THE INVENTION

This invention relates to a liquid cooled charge air cooler for use with an internal combustion engine and, more particularly, to use of coolant bypass ports for improved flow distribution.

BACKGROUND OF THE INVENTION

Internal combustion engine systems are experiencing an increase in the use of turbochargers or superchargers. As is well known, a turbocharger includes a turbine wheel that is driven by the exhaust gases from the engine and which in turn drives a rotary compressor. A supercharger includes a rotary compressor which is directly driven by the engine or by a motor which is ultimately powered by the engine.

In either case, the rotary compressor compresses combustion air prior to its admission to the combustion chambers of the internal combustion engine. When a turbocharger is used, the system recovers part of the waste energy that results when incompletely spent exhaust gases are permitted to expand without performing work. Both types of system provide for higher compression ratios than are obtainable by the geometry of the internal combustion engine itself and allow the combustion of greater quantities of fuel for any given operating condition to provide an increase in engine power.

It has long been observed that when the incoming combustion air is compressed by the rotary compressor, it is simultaneously heated which, in turn, means that its density is decreased. Thus, at any given pressure, a unit volume of hot air from a turbocharger or a supercharger contains a lesser quantity of oxygen available for combustion than would an identical volume of cold air at the same pressure. This factor, in turn, places a limitation on the amount of fuel that may be burned in any given operating cycle of an internal combustion engine, which in turn limits the output thereof. Consequently, particularly in vehicular applications, a so-called charge air cooler has been introduced between compressor stages or between the compressor side of the turbocharger or supercharger and the intake manifold (or equivalent) for the internal combustion engine. The hot, combustion air from the turbocharger or the supercharger, is passed through the charge air cooler to the engine. At the same time, air or liquid is passed through the charge air cooler in a flow path isolated from the combustion air, but in heat exchange relation therewith. Cooling of the combustion air is obtained to increase the density of the combustion air to ultimately provide a greater quantity of oxygen per charge of air to the engine to support the combustion of a greater quantity of fuel, increasing the output of the engine.

The present invention is directed to improvements in liquid cooled charge air coolers.

SUMMARY OF THE INVENTION

In accordance with the invention, there is provided a liquid cooled charge air cooler for use with an internal combustion engine which provides multi-passing of coolant flow while maintaining good coolant flow distribution.

In accordance with one aspect of the invention a liquid cooled charge air cooler for use with an internal combustion engine comprises a plurality of separator plates supported in parallel spaced relation with one another to define a plurality of pairs of adjacent separator plates. The pairs alternatingly define a first set of adjacent pairs and a second set of adjacent pairs. A charge air inlet and a charge air outlet are each in fluid communication with the first set of adjacent pairs. A coolant inlet and a coolant outlet are each in fluid communication with the second set of adjacent pairs. Fins extend between adjacent separator plates of the first set of adjacent pairs to define a charge air flow path between the charge air inlet and a charge air outlet. A plurality of dams extend between adjacent separator plates of the second set of adjacent pairs in a select offset configuration to define a multi-pass coolant flow path between the coolant inlet and a coolant outlet in heat exchange relation with the charge air flow path. Each dam comprises an associated bypass port allowing a portion of coolant to bypass through the dams.

The cooler may be of stamped plate construction or of stacked bar plate construction.

It is a feature of the invention that the dams comprise elongate bars sandwiched between adjacent separator plates of the second set of adjacent pairs with the bars having a length less than a width of the separator plates and alternatingly extending from opposite longitudinal sides to define the multi-pass liquid flow path. Each bypass port may comprise a notch in each of the bars. The notches may be located proximate to the longitudinal side from which the associated bar extends.

It is another feature of the invention that the dams comprise elongate raised bars stamped in adjacent separator plates of the second set of adjacent pairs with bars having a length less than a width of the separator plates and alternatingly extending from opposite longitudinal sides to define the multi-pass liquid flow path.

There is disclosed in accordance with another aspect of the invention a liquid cooled charge air cooler for use with an internal combustion engine comprising a plurality of separator plates supported in parallel spaced relation with one another to define a plurality of pairs of adjacent separator plates. Fins extend between a first set of the plurality of pairs of adjacent separator plates in a fluid communication with a charge air inlet and a charge air outlet to define a charge air flow path between the charge air inlet and the charge air outlet. A plurality of dams extend between adjacent separator plates of a second set of the plurality of pairs of adjacent separator plates and in fluid communication with a coolant inlet and a coolant outlet in a select offset configuration to define a multi-pass coolant flow path between the coolant inlet and the coolant outlet in heat exchange relation with the charge air flow path. Each dam comprises an associated bypass support allowing a portion of coolant to bypass through the dams.

There is disclosed in accordance with a further aspect of the invention an improvement in a liquid cooled charge air cooler for use with an internal combustion engine including a plurality of separator plates supported in parallel spaced relation with one another to define a plurality of pairs of adjacent separator plates and a first set of the plurality pairs of adjacent separator plates to define a charge air flow path. The improvement comprises a plurality of dams extending between adjacent separator plates of a second set of the plurality of pairs of adjacent separator plates in a select offset configuration to define a multi-pass coolant flow path in heat exchange relation with the charge air flow path. Each dam comprises an associated bypass port allowing a portion of coolant to bypass through the dams.

Further features and advantages of the invention will be readily apparent from the specification and from the drawings.

BRIEF DESCRIPTION OF THE DRAWINGS

FIG. 1 is a perspective view of a liquid cooled charge air cooler in accordance with the invention;

FIG. 2 is a perspective view similar to FIG. 1 with an end plate removed;

DETAILED DESCRIPTION OF THE INVENTION

Figure 4:
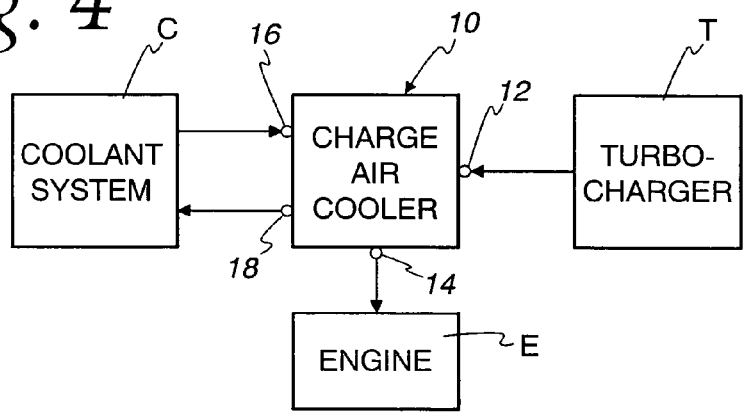
FIG. 4 is a block diagram of an engine system using the charge air cooler of FIG. 1.

Referring to FIG. 1, a liquid cooled charge air cooler 10 in accordance with the invention is illustrated. The charge air cooler 10 is intended for use as part of an engine system with an internal combustion engine E, see also FIG. 4. The charge air cooler 10 has a charge air inlet 12 and charge air outlet 14 for connection between compressor stages or between the compressor side of a turbocharger T, see FIG. 4, or supercharger and an intake manifold of the engine E, any of which are conventional in design. A coolant inlet 16 and a coolant outlet 18 are operatively connected to a coolant system C, see FIG. 4, which may be conventional in design and may comprise a heat exchanger to cool a liquid coolant, a pump and/or other appurtenances to remove heat from the coolant, as is known.

Figure 3:
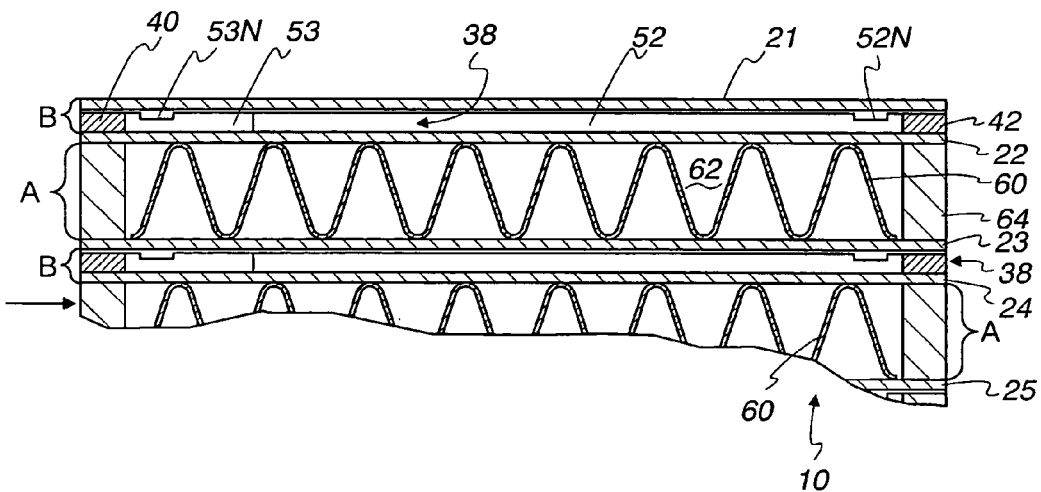
FIG. 3 is a partial sectional view taken along the line 3-3 of FIG. 1.

Referring to FIG. 3, the illustrated charge air cooler 10 is of stacked bar plate construction. Alternatively, the cooler 10 could be of stamped plate construction, as described more specifically below.

The charge air cooler 10 includes a plurality of separator plates including a first end plate 21 and successive interior separator plates, four of which 22, 23, 24, 25 are shown in FIG. 3, and an opposite second end plate 26, see FIG. 1. In the illustrated embodiment of the invention there are about twenty-six interior separator plates, although more or fewer could be used, as desirable. For simplicity herein, the portion of the charge air cooler 10 illustrated in FIG. 3 and including the separator plates 21-25 is described in detail, it being understood that the other portions of the charge air cooler construction are similar.

As described more specifically below, the separator plates 21-25 are supported in parallel spaced relation with one another to define a plurality of pairs of adjacent separator plates. For example, the plates 21 and 22 are adjacent to one another and define a first pair, the plates 22 and 23 are adjacent to one another and define a second pair, the plates 23 and 24 are adjacent to one another and define a third pair, and the plates 24 and 25 are adjacent to one another and define a fourth pair. The pairs alternatingly define a first set of adjacent pairs, labeled A and second set of adjacent pairs, labeled B. The spacing between plates of the first set of pairs A is greater than spacing between plates of the second set of pairs B. The pairs of the first set A are in fluid communication with the charge air inlet 12 and the charge air outlet 14 and are used for charge air flow while the pairs of the second set B are in fluid communication with the coolant inlet 16 and the coolant outlet 18 and are used for coolant flow.

Referring to FIG. 2, the charge air cooler 10 is illustrated with the end plate 21 removed. The first interior separator plate 22 is planar and is generally rectangular with projections 30 and 32 at opposite ends of one side edge. Each projection 30 and 32 has a respective through opening 34 and 36 in respective communication with the coolant inlet 16 and coolant outlet 18. A bar plate 38 is stacked atop the first interior separator plate 22. When the end plate 21 is in position, as shown in FIGS. 1 and 3, the bar plate 38 extends between the adjacent separator plates 21 and 22, as is apparent. The bar plate 38 includes opposite longitudinally extending peripheral side walls formed by elongate bars 40 and 42 connected by peripheral end walls formed by elongate bars 44 and 46. The bar plate 38 also includes a plurality of fingers formed by elongate parallel bars 48, 49, 50, 51, 52, 53 and 54 in a select offset configuration. Particularly, the even numbered fingers 48, 50, 52 and 54 extend from the second side wall bar 42, while the odd numbered fingers 49, 51, and 53 extend from the first side wall bar 40. Each of the fingers 48-54 has a length less than a width of the separator plate 22 so that they do not extend all the way to the opposite side wall bar 40 or 42. As such, the fingers 48-54 function as dams or baffles 55 to define a multi-pass coolant flow path from the coolant inlet 16 to the coolant outlet 18, as is known.

In accordance with the invention, each dam 55 comprises an associated bypass port 56. Each bypass port 56 comprises a notch 48N, 49N, 50N, 51N, 52N, 53N and 54N in an associated one of the respective fingers 48, 49, 50, 51, 52, 53 and 54. The notches 48N-54N are located proximate the side wall bar 40 or 42 from which the associated respective finger 48-54 extends. Each bypass port 56 allows a portion of coolant to bypass through the dam 55 to reduce stagnation in liquid flow downstream from the dam 55 and thus to maintain good coolant flow distribution.

A bar plate 38 is provided between adjacent separator plates of each pair of the second set B.

A plurality of fins 60 extend between adjacent separator plates of each of the first set A of adjacent pairs to define a charge air flow path 62 between the charge air inlet 12 and the charge air outlet 14, as is conventional. A peripheral bar wall bar plate 64 surrounds the fins 62 to enclose the charge air flow path. As such, the bar plates 38 and 64 support the separator plates 21-26 in parallel spaced relation with one another to produce the construction shown in FIGS. 1-3 and the assembly is braised to secure the components into an integral structure.

As is apparent, the charge air cooler 10 could also be formed of stamped plate construction by stamping the separator plates to include raised portions functionally equivalent to the bar plate 38, such as by stamping the peripheral wall bars 40, 42, 44, 46 and the dams 55 and associated bypass ports 56.

Figure 5:
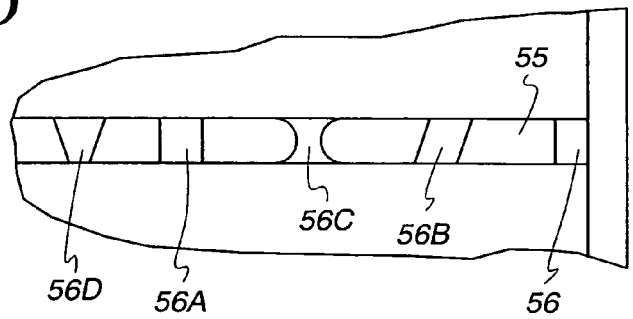
FIG. 5 is an enlarged plan view showing a dam with different configurations for bypass ports.

The embodiment described above illustrates the bypass port 56 in each dam 55 located proximate the peripheral wall. The bypass port 56 in that embodiment provides straight through flow proximate the peripheral wall. As is apparent, the bypass port 56 could be located anywhere along the dam 55 to produce a desired flow effect. Referring to FIG. 5, various options for bypass ports are illustrated. The bypass port 56 could be located proximate the side bar 42, as shown and described above. Alternatively, a bypass port 56A providing straight through flow could be located a select distance away from the side bar 42. Additionally, multiple bypass ports, such as the bypass port 56 and the bypass port 56A could be provided with any desired spacing. Although two of the straight through bypass ports 56 and 56A are shown, additional could be provided, if necessary or desired.

Additionally, the bypass ports can be shaped to produce a desired effect. For example, a bypass port 56B is shown angled to direct flow toward the side bar 42. The bypass port 56B could be oppositely angled to direct flow away from the side bar. A bypass port 56C is shown as narrowed in the middle to provide a venturi-like effect to act as a higher velocity jet. Alternatively, a bypass port 56D diverges from narrow at an inlet to wider at an outlet to provide slowly diffusing flow.

As is apparent, the bypass ports can be on either the top or the bottom of the dams 55.

In accordance with the invention, the charge air cooler 10 provides coolant multi-passing which maintains adequate coolant velocity while the bypass ports maintain good flow distribution. This minimizes stagnant pockets of coolant. Thus, while the dams 55 divert coolant to create the multi-passing effect to improve heat transfer performance for low flow charge air coolers, the bypass ports 56 allow a percentage of the coolant to pass through the dams to maintain good flow distribution with multi-passing.

Thus, there is described a multi-passing liquid cooled charge air cooler with coolant bypass ports for improved coolant flow distribution. The illustrated embodiment of the invention is intended to illustrate the basic concepts of the invention and is not intended to limit the scope of the invention.

We claim:

1. A liquid cooled charge air cooler for use with an internal combustion engine comprising:
    a plurality of separator plates supported in parallel spaced relation with one another to define a plurality of pairs of adjacent separator plates, the pairs alternatingly defining a first set of adjacent pairs and a second set of adjacent pairs;
    a charge air inlet and a charge air outlet each in fluid communication with the first set of adjacent pairs;
    a coolant inlet and a coolant outlet each in fluid communication with the second set of adjacent pairs,
    fins extending between adjacent separator plates of the first set of adjacent pairs to define a charge air flow path between the charge air inlet and the charge air outlet; and
    a plurality of dams extending between adjacent separator plates of the second set of adjacent pairs in a select offset configuration to define a multi-pass coolant flow path between the coolant inlet and the coolant outlet in heat exchange relation with the charge air flow path, wherein the multi-pass coolant flow path includes at least two substantially oppositely directed portions, each dam comprising an associated bypass port allowing a portion of coolant to bypass at least a portion of the coolant flow path through the dams.

2. The liquid cooled charge air cooler of claim 1 wherein the cooler is of stamped plate construction.

3. The liquid cooled charge air cooler of claim 1 wherein the cooler is of stacked bar plate construction.

4. The liquid cooled charge air cooler of claim 1 wherein the dams comprise elongate bars sandwiched between adjacent separator plates of the second set of adjacent pairs with the bars having a length less than a width of the separator plates and alternatingly extending from opposite longitudinal sides to define the multi-pass liquid flow path.

5. The liquid cooled charge air cooler of claim 4 wherein each bypass port comprises a notch in each of the bars.

6. The liquid cooled charge air cooler of claim 5 wherein the notches are located proximate the longitudinal edge from which the associated bar extends.

7. The liquid cooled charge air cooler of claim 1 wherein the dams comprise elongate raised bars stamped in adjacent separator plates of the second set of adjacent pairs with the bars having a length less than a width of the separator plates and alternatingly extending from opposite longitudinal sides to define the multi-pass liquid flow path.

8. The liquid cooled charger cooler of claim 1 wherein each dam comprises a plurality of associated bypass ports allowing a portion of coolant to bypass through the dams.

9. The liquid cooled charger cooler of claim 1 wherein at least one bypass port comprises an angled notch in at least one of the dams.

10. The liquid cooled charger cooler of claim 1 wherein each bypass port comprises a notch shaped to control flow rate through the bypass port.

11. A liquid cooled charge air cooler for use with an internal combustion engine comprising:
    a plurality of separator plates supported in parallel spaced relation with one another to define a plurality of pairs of adjacent separator plates;
    a charge air inlet and a charge air outlet;
    a coolant inlet and a coolant outlet;
    fins extending between a first set of the plurality of pairs of adjacent separator plates and in fluid communication with the charge air inlet and the charge air outlet to define a charge air flow path between the charge air inlet and the charge air outlet; and
    a plurality of dams extending between adjacent separator plates of a second set of the plurality of pairs of adjacent separator plates and in fluid communication with the coolant inlet and the coolant outlet in a select offset configuration to define a multi-pass coolant flow path between the coolant inlet and the coolant outlet in heat exchange relation with the charge air flow path, wherein the multi-pass coolant flow path includes at least two substantially oppositely directed portions, each dam comprising an associated bypass port allowing a portion of coolant to bypass at least a portion of the coolant flow path through the dams.

12. The liquid cooled charge air cooler of claim 11 wherein the cooler is of stamped plate construction.

13. The liquid cooled charge air cooler of claim 11 wherein the cooler is of stacked bar plate construction.

14. The liquid cooled charge air cooler of claim 11 wherein the dams comprise elongate bars sandwiched between adjacent separator plates of the second set of the plurality of pairs with the bars having a length less than a width of the separator plates and alternatingly extending from opposite longitudinal sides to define the multi-pass liquid flow path.

15. The liquid cooled charge air cooler of claim 14 wherein each bypass port comprises a notch in each of the bars.

16. The liquid cooled charge air cooler of claim 15 wherein the notches are located proximate the longitudinal edge from which the associated bar extends.

17. The liquid cooled charge air cooler of claim 11 wherein the dams comprise elongate raised bars stamped in adjacent separator plates of the second set of the plurality of pairs with the bars having a length less than a width of the separator plates and alternatingly extending from opposite longitudinal sides to define the multi-pass liquid flow path.

18. The liquid cooled charger cooler of claim 11 wherein each dam comprises a plurality of associated bypass ports allowing a portion of coolant to bypass through the dams.

19. The liquid cooled charger cooler of claim 11 wherein at least one bypass port comprises an angled notch in at least one of the dams.

20. The liquid cooled charger cooler of claim 11 wherein each bypass port comprises a notch shaped to control flow rate through the bypass port.

21. In a liquid cooled charge air cooler for use with an internal combustion engine including a plurality of separator plates supported in parallel spaced relation with one another to define a plurality of pairs of adjacent separator plates, and a first set of the plurality of pairs of adjacent separator plates defining a charge air flow path, the improvement comprising:

a plurality of dams extending between adjacent separator plates of a second set of the plurality of pairs of adjacent separator plates in a select offset configuration to define a multi-pass coolant flow path in heat exchange relation with the charge air flow path, wherein the multi-pass coolant flow path includes at least two substantially oppositely directed portions, each dam comprising an associated bypass port allowing a portion of coolant to bypass at least a portion of the coolant flow path through the dams.

22. The improvement of claim 21 wherein the dams comprise elongate bars sandwiched between adjacent separator plates of the second set of the plurality of pairs with the bars having a length less than a width of the separator plates and alternatingly extending from opposite longitudinal sides to define the multi-pass liquid flow path.

23. The improvement of claim 22 wherein each bypass port comprise a notch in each of the bars located proximate the longitudinal edge from which the associated bar extends.

24. The improvement of claim 21 wherein the dams comprise elongate raised bars stamped in adjacent separator plates of the second set of the plurality of pairs with the bars having a length less than a width of the separator plates and alternating extending from opposite longitudinal sides to define the multi-pass liquid flow path.

25. The improvement of claim 24 wherein each bypass port comprise a notch in each of the bars located proximate the longitudinal edge from which the associated bar extends.

* * * * *